Figure 1:
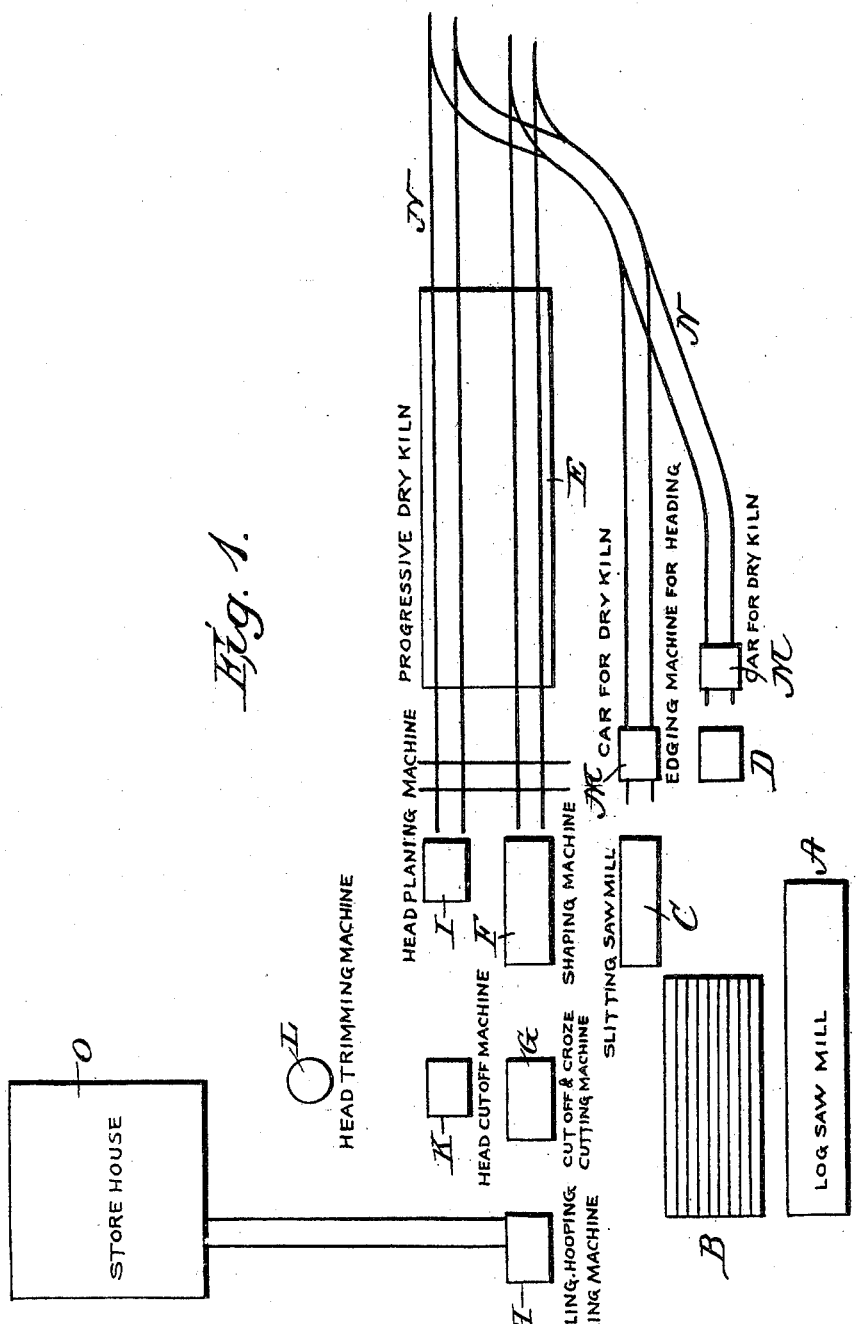

No. 679,276. Patented July 23, 1901.
O. H. P. CORNELL.
MANUFACTURE OF BARRELS.
(Application filed Dec. 28, 1900.)
(No Model.) 2 Sheets—Sheet 2.

Witnesses
Franck L. Ourand
W. Parker Reinohl

Inventor
Oliver H. P. Cornell.
By D. P. Reinohl
Attorney

UNITED STATES PATENT OFFICE.

OLIVER H. P. CORNELL, OF BROOKLYN, NEW YORK.

MANUFACTURE OF BARRELS.

SPECIFICATION forming part of Letters Patent No. 679,276, dated July 23, 1901.

Application filed December 28, 1900. Serial No. 41,099. (No model.)

*To all whom it may concern:*

Be it known that I, OLIVER H. P. CORNELL, a citizen of the United States, residing at Brooklyn, in the county of Kings and State of New York, have invented certain new and useful Improvements in the Manufacture of Barrels; and I do hereby declare the following to be a full, clear, and exact description of the invention, such as will enable others skilled in the art to which it appertains to make and use the same.

My invention relates to the art of making barrels, has for its object the manufacture of barrels subject to the minimum of shrinkage, economy in labor, and saving of material, and consists in certain improvements, which will be fully disclosed in the following specification and claims.

The present and according to my practical experience the prevailing practice of making barrel-staves is as follows: The logs are cut into thirty-inch lengths by hand by two men with a crosscut-saw, then split with a beetle and wedge into pieces of not over six inches on the circumference of the log, thus making a log twenty-four inches in circumference produce four "stave-bolts," a tree thirty inches in circumference five stave-bolts, and so on. The bolts are then piled or ranked where cut to enable the men cutting the timber to ascertain the value of their labor, which is usually valued by the cord. As this is in the woods and not on the highway, it is impossible to haul a full load to the stave-factory. It is hence customary to haul the bolts to the highway in small loads and pile or rank them again, and then haul to the stave-factory and pile and rank again, that the purchaser may measure to his own satisfaction. The bolts are then generally placed on wheelbarrows and taken to a steaming vat or room seven or eight feet square, where the bolts are piled one by one until the vat is full, when live steam is turned on and continued until the bolts are thoroughly steamed and made as soft as possible, when they are again placed on a wheelbarrow and taken to a stave-cutter, which is a large knife slightly longer than the stave-bolt and fastened on the ends of two pivoted arms. This at every stroke cuts off a stave or veneer from the bolt, cutting nearly with the growth of the timber, and beginning at the outer circumference of the bolt leaves much wasted material at or near the heart of the bolt and on the edges of the stave, besides the sound or hard knots, as these are excluded because the knife cannot cut them. These stave-blanks are again placed on a wheelbarrow and wheeled into the yard, where they are piled very carefully, so that they will only rest on each other at their extreme ends, in order to dry as quickly as possible without being discolored. This process, although carried on by boys, is tedious and requires large drying-yards, as under the most favorable conditions it usually requires from twenty-five to thirty days to dry stave-blanks. The stave-blanks are then again placed on a wheelbarrow and taken to the jointers, which are machines with a slightly-curved knife working in perpendicular grooves and drawn down by foot-power and returned by a spring or weight, the edges of each blank being placed under the knife successively and from three-fourths to an inch cut off. The blanks are then tied in bundles of about thirty to a bundle and piled ready to ship to the cooper, who has to cut them to lengths, croze them, and cooper the barrel, thus having four serious items of waste, as follows: First, timber with small sound knots, which would not injure the common barrel; second, the heart-piece of each stave-bolt; third, fully fifteen per cent. of each stave-blank in jointing, and, fourth, fully five per cent. of the stave in squaring the ends and cutting to proper length, which amounts to a total of from thirty to thirty-five per cent. of the original timber. Not only this excessive waste is to be considered, but the product—a stave cut with the growth of the timber, and consequently subject to further shrinkage after the barrrel has been made, so that for packing cement, sugar, and other like articles the barrels must be lined with paper to prevent waste of the material in handling and in transportation.

Under the old practice or system of making barrels with staves cut from bolts with the growth of the tree the periphery of the barrel always shrinks and swells from three to four times as much as the heads, making it almost impossible to construct a barrel for dry uses that will remain tight.

My method is designed to equalize the shrinkage of the material from which barrels are made as nearly as possible.

It is my purpose to reduce the labor and waste incident to making barrels to the minimum by taking timber in the logs the length of five or seven barrel-staves, cut off the outer surface on four sides into material cut with the growth of the timber for making the heads of barrels until the log has been squared, then cut the log into planks of a thickness slightly in excess of the width of a barrel-stave and turn the log a quarter-turn after each cut to produce as near as possible quartered stuff, which when worked into staves are cut at approximately a right angle to the growth of the timber and are subject to the minimum of shrinkage, and the heads being made of material cut with the growth of the timber, which shrinks in one direction—namely, at a right angle to the length of the heading material—the shrinkage of the heads and the staves is as near equal as possible, all hard or solid knots used, the waste minimized, and the labor of frequent handling of the material reduced to the lowest degree.

As a result of my invention barrels are produced from the stump of a tree to the completed barrel with fully thirty per cent. less labor than is now employed or expended to produce the staves to make a barrel before they reach the cooper.

Figure 2:
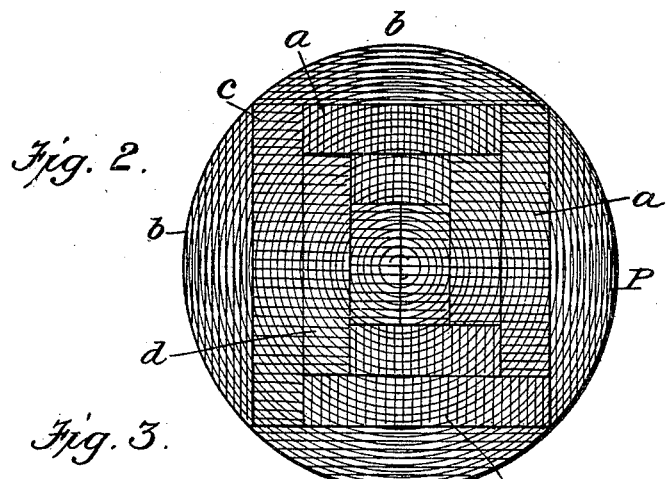
Figure 3:
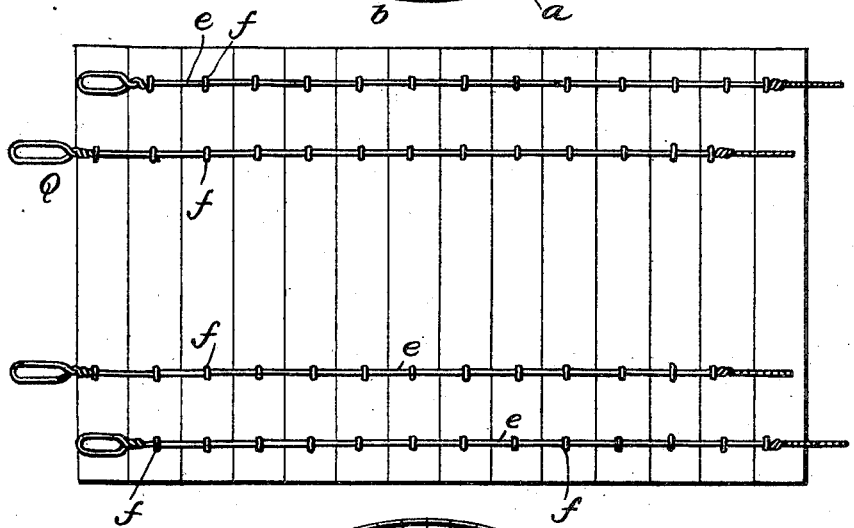
Figure 4:
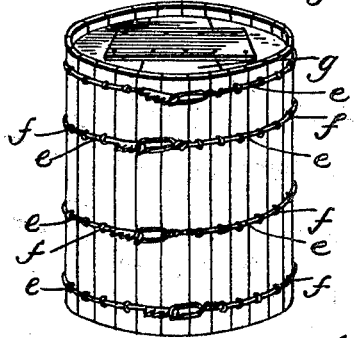

In the accompanying drawings, which form part of this specification, Figure 1 represents a diagrammatic view of my improved plant; Fig. 2, a transverse section of a log of timber; Fig. 3, a plan of the staves of a barrel assembled and secured to the hoops, and Fig. 4 a perspective of a completed barrel on a reduced scale.

Reference being had to the drawings and the letters thereon, A indicates a log-sawmill, in which a log is severed into material for making heading and planks for making stave-blanks, as will hereinafter more fully appear; B, a pile of lumber cut by said mill; C, a slitting-mill, in which the planks are cut into stave-blanks; D, an edging-machine, in which the edges are cut from the material to be used for making barrel-heads; E, a progressive drying-kiln, in which the stave-blanks and heading material are subjected to heat to dry them; F, a shaping-machine, in which the two faces and the edges of the stave-blanks are dressed and the edges beveled; G, a cut-off and croze-cutting machine, in which the stave-blanks are cut into lengths of staves and the croze formed in each end of the staves; H, an assembling, hooping, and stapling machine, in which the staves required to make a barrel are assembled and the hoops applied to the staves and secured thereto by staples; I, a head-planing machine, in which the material to make the heads of barrels is planed and jointed; K, a machine in which the material for making heads is cut into proper length and width, and L a head-trimming machine, in which the heads are trimmed and the edge beveled to the angle of the croze in the staves.

M M are cars for conveying lumber to the drying-kiln, to the shaping-machine, and to the head-planing machine, N the railway track, and O the storehouse, in which the knockdown barrels are stored awaiting shipment.

P indicates a log of timber, in which the concentric circles or lines $a$ represent the growth of the tree, and $b\ b\ b\ b$ the outside boards, which are cut from four sides to square the log, and these boards are used for making heading material.

$c$ indicates plank which are cut by turning the log one-quarter successively after each plank has been severed from the log until the center piece is reached, when the last cut is made through the center of it, and $d$ the stave-blanks.

Q indicates the barrel-staves, secured to their hoops $e$ by staples $f$ and ready to be bent and supplied with heads and made into a barrel.

R indicates a completed barrel with the head $g$ in position and the hoops $e$ drawn taut, ready for shipment as a filled barrel.

It is my purpose to locate my plant in or near the woods from which the timber is cut and to do all the coopering there, so that the barrels can be crated as flat mats with heads for each barrel and set up by unskilled labor wherever they are to be used and knocked down and returned for refilling at very small expense for freight. The staves properly crozed may, however, be bundled and sold as articles of commerce, and barrels made therefrom in ordinary coopering-shops and by the use of other hoops.

Having thus fully described my invention, what I claim is—

1. The method of making barrels, which consists in cutting heading material with the growth of the timber, and cutting sections or plank of a thickness equal to the width of a stave, then severing said sections into stave-blanks cut at approximately a right angle to the growth of the timber, then shaping the blanks into the form of staves, then crozing the staves and providing heads for the barrels from material cut with the growth of the timber.

2. The method of making barrels, which consists in removing the outer portions of a log or piece of timber on four sides by cutting off boards to make heading material cut with the growth of the timber, until the log has been squared, then severing the log longitudinally into sections the length of several staves and of a thickness equal to the width of a stave and cutting successively from sides of the log at a right angle to each other, then severing said sections into strips the thickness of a stave and cut at approximately a right angle to the growth of the timber, then subjecting the strips or multiple stave-length blanks to heat, then shaping the blanks into the form of staves, then severing the blanks and crozing the staves, then assembling the staves in the form of mats the length of the circumference of a barrel and securing the staves to hoops, and then providing heads for the barrel from material cut with the growth of the timber.

3. The method of making barrels, which consists in removing the outer portions of a log or piece of timber on four sides by cutting off boards to make heading material cut with the growth of the timber, until the log has been squared, then severing the log longitudinally into sections the length of several staves and of a thickness equal to the width of a stave and cutting successively from sides of the log at a right angle to each other, then severing said sections into strips the thickness of a stave and cut at approximately a right angle to the growth of the timber, then subjecting the strips or multiple stave-length blanks to heat, then shaping the blanks into the form of staves, then severing the blanks and crozing the staves, then assembling the staves in the form of mats the length of the circumference of a barrel and securing the staves to hoops; edging the heading material, drying said material, planing the material, cutting the material into lengths for barrel-heads and forming the heads from said material cut with the growth of the timber.

In testimony whereof I affix my signature in presence of two witnesses.

OLIVER H. P. CORNELL.

Witnesses:
CHAS. H. BLAIR,
ANDERSON PRICE.